Nov. 1, 1966            F. LEIGHTON           3,282,169
PNEUMATIC SERVICE BRAKE ACTUATOR AND SPRING-POWERED
PARKING-EMERGENCY BRAKE ACTUATOR
WITH TANDEM DIAPHRAGMS

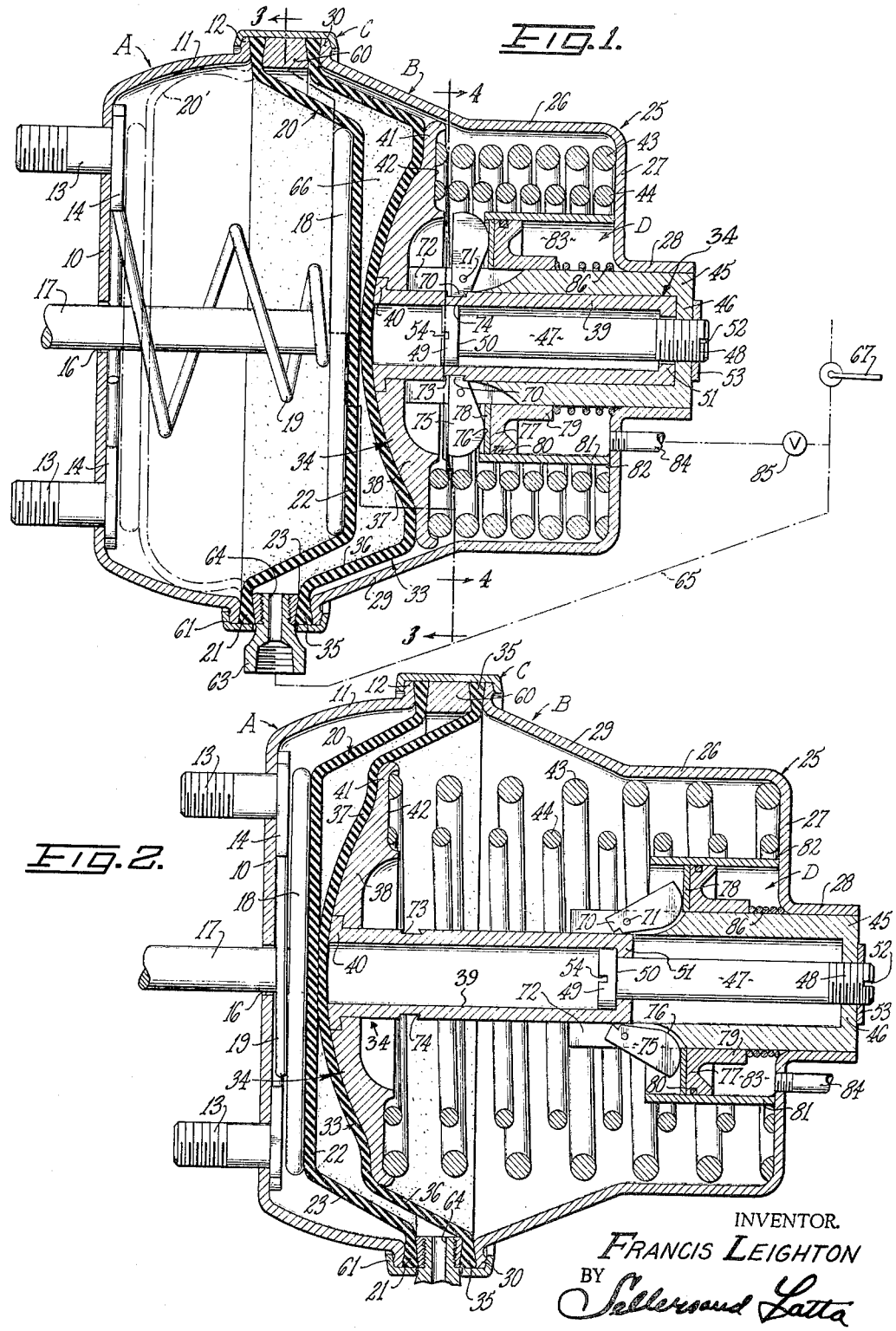

Filed July 24, 1962           2 Sheets-Sheet 2

INVENTOR.
FRANCIS LEIGHTON
BY
ATTORNEYS

United States Patent Office 3,282,169
Patented Nov. 1, 1966

3,282,169
PNEUMATIC SERVICE BRAKE ACTUATOR AND SPRING - POWERED PARKING - EMERGENCY BRAKE ACTUATOR WITH TANDEM DIAPHRAGMS
Francis Leighton, Encino, Calif., assignor, by mesne assignments, to Rockwell-Standard Corporation, Pittsburgh, Pa., a corporation of Delaware
Filed July 24, 1962, Ser. No. 212,044
16 Claims. (Cl. 92—24)

This invention relates generally to brake actuators of the combined fluid and spring-powered type exemplified by Leighton-Herman Patent No. 2,992,630, wherein a spring-powered auxiliary unit is arranged in "piggyback" relation to an air pressure responsive service brake actuating diaphragm, for transmitting spring-powered braking pressure through the diaphragm to the brakes when air pressure fails.

The general object of this invention is to provide, in such a combination, an air pressure responsive movable wall for retracting the parking-emergency braking spring or springs when adequate service-braking air pressure exists in the system, and for thus placing the parking-emergency unit in inoperative position, said movable wall being in direct abutting relationship to the service brake diaphragm when transmitting pressure thereto, thus eliminating a partitioning bulkhead which has heretofore been utilized to separate the service braking air chamber from the parking brake retractor air chamber of the apparatus. Thus it becomes possible to make the actuator assembly more compact by substantially reducing its axial length, which is a principal and important object of the invention, since in many installations, where a combined actuator of this type is substituted for a conventional air brake actuator (a diaphragm within an air chamber) the space available for the actuator is quite restricted and in many cases is not of sufficient depth to receive the combined service and parking-emergency brake actuator assemblies now available on the market.

A further object is to avoid the necessity for using O-ring seals between the sliding piston and the cylinder of the conventional parking-emergency brake actuator unit while improving the pneumatic seal between the air pressure responsive movable retractor wall of this unit and the housing thereof. Another object is to simplify the construction of the housing and the arrangement of the respective air pressure responsive service brake actuator and parking brake retractor elements of the apparatus. These objects are attained by providing a combination wherein the movable retractor wall of the parking-emergency actuator unit is in the form of a diaphragm having its periphery secured and sealed in the housing adjacent the periphery of the service actuator diaphragm and closely adjacent the same so as to transmit spring pressure thereto by direct contact between the centers of the two diaphragms.

Another object is to provide such an apparatus wherein the two diaphragms are under air pressure for only short periods of time, the service brake diaphragm being subjected to air pressure only during the short intervals of service braking operation, and the parking-emergency brake retractor diaphragm being subjected to pressure sufficient to retract the springs of this unit but restricted to the same short intervals of time as the service diaphragm.

Consistent with this object, the invention further aims to provide a parking-emergency braking unit embodying a spring-loaded pressure-transmitting plunger associated with mechanical latching means for holding the same in retracted position attained by the air-pressure responsive retracting action of the retractor diaphragm, whereby this unit will be held in retracted position after air pressure against the forward face of the retractor diaphragm has been released.

A further object is to provide, in such an arrangement, a pneumatic latch actuator adapted, in response to air pressure in the system when at the proper level for operating the service brakes, to maintain mechanical latching of the parking-emergency actuator plunger in its retracted position, withstanding the load of the compressed emergency actuator springs; and responsive to a drop in air pressure in the system below the effective level for service brake operation, to release the latching means, thereby releasing the plunger for emergency or parking brake actuation, depending upon whether the release of air was caused by a failure in the air system or was effected under manual control for parking purposes. In this connection, a still further object of the invention is to provide in a mechanism as outlined above, a manually operated valve for operator-controlled release of air in the latch-holding unit so as to release the auxiliary actuator unit for parking brake actuation.

Other objects and advantages will become apparent in the ensuing specification and appended drawing in which:

FIG. 1 is a an axial sectional view of a combined service brake and parking-emergency brake assembly embodying the invention, with both actuator units in their retracted positions;

FIG. 2 is an axial sectional view of the same, with the two units projected to brake-actuating position by spring operation of the parking-emergency unit;

*General description*

Figure 3:
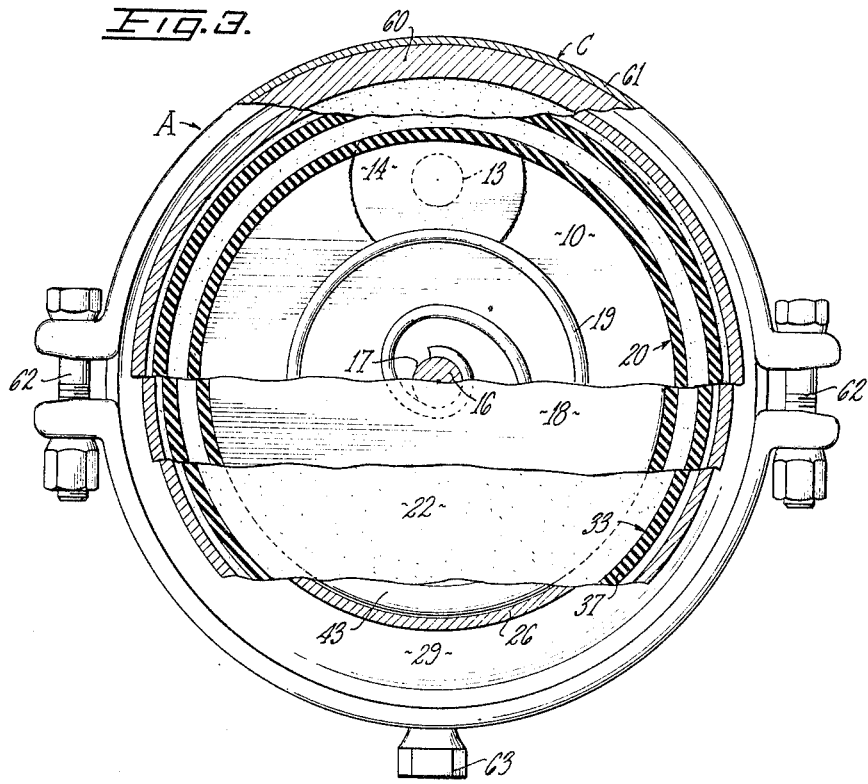
FIG. 3 is a transverse sectional view taken on the line 3—3 of FIG. 1.
Figure 4:
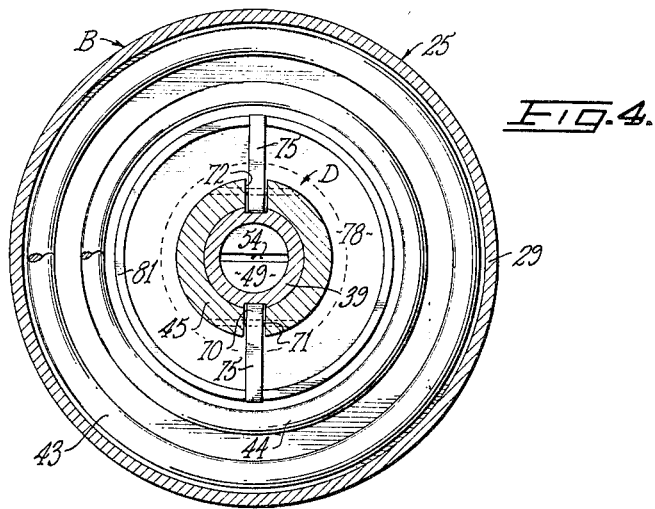
FIG. 4 is a transverse sectional view of the spring chamber, taken on the line 4—4 of FIG. 1.

Referring now to the drawings in detail, I have shown therein, as an example of one form in which my invention may be embodied, a combined service brake and parking brake actuator assembly comprising, in general, a pneumatic service brake unit A; a spring-powered emergency-parking actuator unit B; coupling means C joining the units A and B to one another; and a latching unit D for holding the operative parts of parking-emergency actuator unit B in retracted condition.

*Detailed description*

Service Brake Actuator Unit A may be of the construction disclosed in my pending patent application S.N. 189,194, filed April 20, 1962 for Air Brake Actuator of Minimum Axial Depth, comprising a dished housing section with a flat front wall 10, a bell-shaped rim wall 11 and a rim flange 12; and threaded mounting studs 13 having thin flat heads 14 secured to the inner face of front wall 10, the studs projecting through apertures in said front wall, for mounting the assembly to the brake-mounting brackets of a truck or other vehicle. Slidably extended through a central opening 16 in the front wall 10 is a brake-operating rod 17 having a large, flat disc head 18 secured to its rear end. Engaged between the disc head 18 and the front wall 10 is a conical retractor spring 19 for normally holding the brake rod 17 in retracted position and for retracting it after brakes have been applied. A service brake actuator (air brake) diaphragm 20 has a rim 21 clamped against the rim flange 12; and a dish-shaped body including a flat central portion 22 bearing against the rear face of actuator rod disc 18 and a shaped frusto-conical peripheral wall portion 23 the normal shape of which is as shown in FIG. 1. Thus the diaphragm assumes its normal shape and is strain-free in its retracted position. When subjected to air pressure for actuating the brakes, the diaphragm 20 moves forwardly, is "turned inside out" and assumes a distended position approximately as shown in broken lines at 20' in FIG. 1.

*Parking-Emergency Actuator Unit B* comprises a rear housing section 25 including a spring-chamber cylinder 26, an annular rear end wall 27 which may be substantially flat as shown, a hub collar 28 projecting rearwardly from the center of rear wall 27, a frusto-conical bell 29 flaring forwardly from the cylinder 26, and a rim flange 30. Sealed against the rim flange 30 is the rim portion 35 of a retractor diaphragm 33 which includes a frusto-conical peripheral wall 36 and a dished reentrant central body portion 37.

The central body portion 37 has its concave face seated against the rear face of a mushroom-shaped head 38 of a plunger 34 which includes a tubular stem 39. At its forward end, stem 39 has a radial flange 40 which is press-fitted in a counterbore in the center of head 38, the stem 39 projecting through a bore extended from the bottom of said counterbore. At its outer end, head 40 has a radial flange 41. In the rear side of head 38, and extending into flange 41, is a shallow annular recess 42 in which are seated (and retained in coaxial assembly in cylinder 26) the ends of a pair of compression coil springs 43, 44. The opposite ends of these springs are seated against the rear wall 27 of rear housing section 25.

Tubular stem 39 is axially slidable in a bore in a slide-bearing sleeve 45 which is secured in the hub collar 28 and projects forwardly therefrom in coaxial relation to cylinder 26. Sleeve 45 has a rear end wall 46. A tie rod 47 has a threaded rear end 48 which is secured by threading in a central aperture in end wall 45 and which has as its forward end an integral head 49 defining a rearwardly facing stop shoulder 50. Plunger stem 39 has at its rear end an annular shoulder flange 51 which is engageable with stop shoulder 50 to determine a forward limit of projection of the plunger in response to the spring load of coil springs 43, 44. Annular shoulder 51 defines a circular central opening which receives the tie rod 47 with a freely-sliding fit. Threaded rear end 48 has a screwdriver slot 52 for adjusting the tie rod 47 to place its stop shoulder 50 in the proper position. A lock nut 53, threaded on the threaded end 48, is adapted to be tightened against the rear end wall 46 of bearing sleeve 45 to lock the tie rod 47 in any selected position of adjustment. Head 50 preferably also has a screwdriver slot 54, for facilitating initial assembly of the apparatus.

*Coupling C* comprises a spacer ring 60 interposed between the rims 21 and 35 of the respective diaphragms 20 and 33; and a conventional channel band clamp 61 with flaring semicircular flanges engaging the flanges 12 and 30 of the housing members 11 and 25 respectively, for axially compressing the sandwich of rim flanges 12, 21, 30 and 35 into sealed engagement with one another and with the opposite end faces of spacer ring 60, and diametrically opposed clamp bolts 62 for tightening the clamp. An air line coupling 63 has a neck sealed and anchored (as by threading) in the spacer ring 60 and defining a port 64 extending axially through the ring. Coupling 63 is adapted to be coupled to the brake-operating air line 65 of a motor truck or other vehicle, whereby by actuating a brake pedal valve 67, air under pressure may be injected into a chamber 66 defined between the diaphragms 20 and 33 and the spacer ring 60, for simultaneously applying the service brakes and retracting the plunger 34 of unit 25.

*Latching Unit D* comprises one or more latch dogs 70 mounted on pivots 71 in respective slots 72 in the forward end of bearing sleeve 45. Slots 72 are disposed in respective planes of the axis of sleeve 45. Dogs 70 are engagable in a shallow annular channel 73 in the outer surface of sleeve 45, the rear side of channel 73 being defined by a frusto-conical, forwardly overhanging shoulder 74, and the dog 70, at the rear extremity of its inner end, having a correspondingly triangular jaw engageable beneath the overhanging shoulder 74.

Formed integrally with the pivoted dogs 70 and projecting outwardly from the pivots 71, are respective actuator levers 75 which have respective convexly curved lobes 76 on their rear sides. Normally, the dogs 70 are maintained in the radially inwardly projecting latching positions shown in FIG. 1, by a control piston 77 having on its forward side, a wear plate 78 in the form of a flat washer, in axially abutting relation to the respective lever lobes 76. Piston 77 has a cylindrical hub 79 slidably mounted upon bearing sleeve 45. Engaged under compression between the rear end of hub 79 and the rear housing wall 27 is a light coil spring 86 which maintains a light spring pressure against the piston 77 to constantly maintain contact between the piston and the lever lobes 76. A piston ring 80, disposed in an annular groove in the periphery of piston 77, seals the piston to the cylindrical inner wall of a control cylinder 81 which is secured and sealed, as by a ring of welding 82, to the inner face of rear wall 27 of housing 25. Defined between piston 77, rear wall 27 and cylinder 81 is a control chamber 83 into which air under pressure may be injected through a control line 84. A two-way valve 85, manually operated, is interposed between the control line 84 and the service air line 65 (or any suitable supplementary source of air under pressure). In a normal position (which it may occupy most of the time) the valve 85 will function to direct air under pressure into the chamber D for maintaining the piston 77 in the forwardly projected position shown in FIG. 1. In an alternate position, valve 85 will close off the connection between line 84 and supply line 65 and will open up the line 84 to atmosphere so as to release the pressure from the chamber 83, thereby permitting the piston 77 to be retracted rearwardly by the pressure of levers 75 against the piston. Such pressure is the resultant of the high pressure of springs 43 and 44, exerted forwardly against the plunger 34 and transmitted from the latch shoulder 74 of stem 39 to the inner ends of dogs 70, tending to swing the dogs forwardly around their pivots 71 and thus tilting the levers 75 rearwardly. When the levers 75 are thus tilted to the positions shown in FIG. 2, the dogs 70 will be swung outwardly sufficiently to clear the shoulder 74 and to ride against the cylindrical periphery of sleeve 39 as indicated in FIG. 2. Thus the plunger 34 is released for forward projection under the expansive action of springs 43, 44, pushing the diaphragm 33 forwardly into engagement with the center of diaphragm 20 through which the pressure is transferred to the brake rod 17 and thus on to the brakes for emergency or parking brake operation.

The spring load transferred to the levers 75 from the springs 43, 44 is adequate to overcome the much lighter opposing load provided by biasing spring 86, so that the latter yields to the rearward tilting of levers 75 under the heavier spring load, when air pressure is released from chamber 83.

When the latch levers 75 are in their tilted retracted positions of FIG. 2, pressure may be reestablished in control chamber 83, tending to tilt the latch dogs back to their normal positions shown in FIG. 1, but this will be resisted by the engagement of the latch dogs against the surface of stem 39, until the plunger 34 has been again retracted to bring its latch groove 73 into registration with the dogs 70.

After the parking or emergency actuation of the brakes, the plunger 34 can be returned to its retracted position by actuating the brake pedal 67 to direct air under pressure into the air brake chamber 66. This will cause the rear diaphragm 33 to be moved rearwardly to its position shown in FIG. 1 (while the forward diaphragm 20 remains substantially fixed in position) (e.g. distended to the position 20′ of FIG. 1). Thus the plunger 34 will be retracted until the dogs 70 biased inwardly by the air pressure in control chamber D enter the latch groove 73 and engage the latching shoulder 74. The air pressure in chamber D will then become effective to lock the dogs 70 in the latching positions shown in FIG. 1. As an alternative to the pressurizing of control chamber 83 prior to relatching the dogs 70 in grooves 73, the valve 85 may be held in the bleed position until the plunger 34 is fully retracted, and the biasing spring 86 may then be utilized to return the piston 77 to its forwardly projected position which in turn will restore the dogs 70 to their latching positions of FIG. 1; and thereafter the valve 85 may be returned to its normal position pressurizing the chamber 83. This has the advantage of minimizing the drag of the dogs 70 against the surface of sleeve 39 as the plunger 34 is retracted.

I claim:

1. In a brake actuator, in combination: an air brake diaphragm and a brake rod arranged to receive pressure from the front side of said diaphragm so as to be projected in a service-braking movement; a retractor diaphragm arranged behind said air brake diaphragm in pressure-transmitting association therewith, for moving said air brake diaphragm and brake rod in a braking movement when projected forwardly; a plunger engaging the rear side of said rectractor diaphragm, spring means acting on said plunger for projecting said diaphragms in an auxiliary braking operation; housing means mounting and cooperating with said diaphragms to define a pneumatic chamber in which air under pressure from a service air line will be effective to project said air brake diaphragm forwardly to service-braking position and to move said retractor diaphragm and plunger rearwardly to a retracted position of the plunger; positively acting holding means automatically operative in response to arrival of said plunger in said retracted position to engage the plunger for holding it in that position; and pneumatic control means operable in response to air pressure to maintain said holding means operative to hold said plunger in retracted position, and automatically responsive to a reduction in air pressure to cause said holding means to release said plunger for spring-energized auxiliary brake operation.

2. The combination defined in claim 1, wherein said housing means includes a front housing section having a central opening through which said brake rod is slidably extended, a rear housing section enclosing said plunger and said spring means and holding means, a spacer ring interposed between the peripheral portions of said diaphragms, said housing sections having rim portions engaging said peripheral diaphragm portions, and means coupling said rim portions to one another and sealing said rim portions to said diaphragms to establish said pneumatic chamber.

3. The combination defined in claim 2, including an air line coupling in said spacer ring, for connecting said pneumatic chamber to an air line.

4. The combination defined in claim 3, including a disc head on the rear end of said brake rod, against which said air brake diaphragm is seated, and a conical retractor spring surrounding said brake rod within said front housing section and engaged under compression between said disc head and a flat front wall of said front housing section, said retractor spring being compressible to flat spiral pancake form between said front wall and said disc head.

5. The combination defined in claim 1, wherein said housing means includes front and rear housing sections having opposed rims between which said diaphragms are mounted and sealed to define said pnuematic chamber.

6. The combination defined in claim 1, wherein said housing means includes front and rear housing sections having opposed rims between which said diaphragms are mounted and sealed to define said pneumatic chamber, said rear housing section including a bell enclosing said retractor diaphragm, and a cylindrical spring-chamber portion extending rearwardly from said bell and enclosing said spring means.

7. The combination defined in claim 1, wherein said housing means includes front and rear housing sections having opposed rims between which said diaphragms are mounted and sealed to define said pneumatic chamber, said rear housing section including a bell enclosing said retractor diaphragm, and a cylindrical spring-chamber portion extending rearwardly from said bell and enclosing said spring means, said spring chamber portion having a rear end wall and hub collar in the center thereof; and a bearing sleeve mounted in said collar and projecting forwardly; said plunger including a stem axially slidable in said bearing sleeve and a head on the forward end of said stem, bearing against the rear face of said diaphragm, said spring means comprising a coil spring disposed in an annular space between said bearing sleeve and said spring chamber portion and engaged under compression between said plunger head and said rear end wall.

8. Apparatus as defined in claim 1, wherein said housing means includes a rear portion defining a spring chamber, said rear portion having a rear end wall; a bearing sleeve secured to the center of said rear end portion and extending forwardly; said plunger including a stem axially slidable in said bearing sleeve and a head on the forward end of said stem, bearing against the rear face of said diaphragm; said pneumatic control means comprising a a cylinder secured at its rear end to said rear end wall and projecting forwardly and a piston slidable axially in said cylinder, a pneumatic control chamber being defined between said piston and said rear end wall within said cylinder; and spring means comprising a coil spring engaged under compression between said plunger head and rear end wall in an annular space between said spring chamber portion and said cylinder, and said holding means comprising a latch dog pivotally mounted in a slot in said bearing sleeve and engageable with a latch shoulder in the outer surface of said stem, said dog having a lever portion extending outwardly and abutted by the forward side of said piston, the latter being operative, in response to air pressure acting against it within said control chamber, to exert forward pressure against said lever portion, effective to maintain said dog in holding position, and being responsive to reduction in air pressure in said control chamber, to yield to the reaction load of said spring means transmitted to said dog through said stem, so as to permit the dog to release the stem for spring-energized forward movement of the plunger to brake-operating position.

9. In a brake actuator, in combination: an air brake diaphragm and a brake rod arranged to receive pressure from the front side of said diaphragm so as to be projected in a service-braking movement; a retractor diaphragm arranged behind and adjacent said air brake diaphragm for direct pressure-transmitting engagement therewith, for moving said air brake diaphragm and brake rod in a braking movement when projected forwardly; a plunger engaging the rear side of said retractor diaphragm, spring means acting on said plunger for projecting said diaphragms in an auxiliary braking operation; housing means mounting and cooperating with said diaphragms to define a pneumatic chamber in which air under pressure from a service air line will be effective to project said air brake diaphragm forwardly to service-braking position and to move said retractor diaphragm and plunger rearwardly to a retracted position of the plunger; positively acting holding means automatically operative in response to arrival of said plunger in said retracted position to engage the plunger for holding it in that position; and pneumatic control means operable in response to air pressure in said service air line to maintain said holding means operative to hold said plunger in retracted position and automatically responsive to reduction in air pressure below a value adequate for air brake operation, to cause said holding means to release said plunger for spring-energized auxiliary brake operation.

10. In a brake actuator, in combination: an air brake diaphragm and a brake rod arranged to receive pressure from the front side of said diaphragm so as to be projected in a service-braking movement; a retractor diaphragm arranged behind and adjacent said air brake diaphragm for direct pressure transmitting engagement therewith, for moving said air brake diaphragm and brake rod in a braking movement when projected forwardly; a plunger engaging the rear side of said retractor diaphragm, spring means acting on said plunger for projecting said diaphragms in an auxiliary braking operation; housing means mounting and cooperating with said diaphragms to define a pneumatic chamber in which air under pressure from a service air line will be effective to project said air brake diaphragm forwardly to service-braking position and to move said retractor diaphragm and plunger rearwardly to a retracted position of the plunger; means for mechanically holding said plunger in said retracted position to render the actuator inoperative after air pressure has been released from said pneumatic chamber; and operator-controlled means for releasing said holding means.

11. In a brake actuator, in combination: an air brake diaphragm and a brake rod arranged to receive pressure from the front side of said diaphragm so as to be projected in a service-braking movement; an auxiliary braking plunger arranged behind and adjacent said air brake diaphragm; a retractor diaphragm interposed between said auxiliary braking plunger and said air brake diaphragm and in contact with the latter for moving said air brake diaphragm and brake rod in a braking movement when projected forwardly; spring means acting on said plunger for projecting said diaphragm in an auxiliary braking operation; said retractor diaphragm being in air pressure responsive retracting engagement with the forward end of said plunger; housing means enclosing and cooperating with said diaphragm and retractor means to define a pneumatic chamber in which air under pressure from a service air line will be effective to project said air brake diaphragm forwardly to service-braking position and to move said retractor means and plunger rearwardly to a retracted position of the plunger; means for mechanically holding said plunger in said retracted position to render the actuator inoperative after air pressure has been released from said pneumatic chamber; and operator-controlled means for releasing said holding means.

12. In a brake actuator, in combination: an air pressure responsive brake actuator element and a brake rod arranged to receive pressure from the front side of said actuator element so as to be projected in a service-braking movement; an air pressure responsive retractor element arranged behind said actuator element in pressure-transmitting association therewith, for moving said actuator element and brake rod in a braking movement when projected forwardly; a plunger engaging the rear side of said retractor element, spring means acting on said plunger for projecting said air pressure responsive elements in an auxiliary braking operation; housing means mounting and cooperating with said air pressure responsive elements to define a pneumatic chamber in which air under pressure from a service air line will be effective to project said actuator element forwardly to service-braking position and to move said retractor element and plunger rearwardly to a retracted position of the plunger; positively acting holding means automatically operative in response to arrival of said plunger in said retracted position to engage the plunger for holding it in that position; and pneumatic control means operable in response to air pressure to maintain said holding means operative to hold said plunger in retracted position, and automatically responsive to a reduction in air pressure to to cause said holding means to release said plunger for spring-energized auxiliary brake operation.

13. A brake actuator as defined in claim 12, wherein said holding means comprises a pivoted latch dog having at its inner end a jaw engageable with said plunger and having an actuator lever projecting outwardly from its pivot; and wherein said control means comprises an air pressure reponsive, axially movable holding member normally applying an air pressure energized load against said lever to hold said jaw in an operative position wherein said plunger is held by said jaw.

14. A brake actuator as defined in claim 13, wherein said holding member comprises an annular piston encircling said plunger and a cylinder, fixed to said housing means, in which said piston is slidable.

15. In a brake actuator, in combination: an air brake diaphragm and a brake rod arranged to receive pressure from the front side of said diaphragm so as to be projected in a service-braking movement; a second diaphragm arranged behind and adjacent said air brake diaphragm for direct pressure transmitting engagement therewith, for secondary brake operation; said diaphragms having respective rim portions and dished bodies each including a central portion and a generally frusto-conical peripheral wall portion integrally joining the respective rim portion to the periphery of the respective central portion, the central portion of said air brake diaphragm being substantially flat and the central portion of said second diaphragm being of meniscus form, said diaphragms, in their retracted positions, being arranged with the dished body of said brake diaphragm nested within the dished body of said second diaphragm, with the central portion of said second diaphragm protruding forwardly and engaging the central portion of said air-brake diaphragm and increasingly diverging therefrom outwardly to the respective peripheral wall portion so as to define between said diaphragms an annular air chamber of maximum depth between the peripheral areas of said central portions thereof; forward and rear housing sections having respective rim flanges engaged against said diaphragm rim portions, and dished body portions projecting forwardly and rearwardly from said air-brake and second diaphragms respectively; a coupling band of channel section receiving and clamping said housing flanges against said diaphragm rim portions and the latter against said spacer ring so as to seal the periphery of said air chamber and to define a second chamber between said second diaphragm and said rear housing section; a fitting in said spacer ring providing an air passage therethrough and providing for coupling to an air pressure line for introducing air into said air chamber between said diaphragm for service brake operation; means providing in said rear housing section a forwardly crowned rigid wall conforming to the retracted contour of said central portion of the second diaphragm and supporting it against rearward distention when subjected to pressure in said air chamber; and a brake-actuator rod having a head of flat disc form engaged against the forward face of said flat central portion of the air brake diaphragm and a shaft portion projecting forwardly through said forward housing section.

16. A friction device operating mechanism comprising a housing, fluid pressure responsive actuator means in said housing for normally energizing a friction device, resiliently urged means movable in said housing between an inoperative position and an operative friction device energizing position in driving engagement with said actuator means, control means defining with said housing a fluid pressure chamber, other means, engaged with said control means and adapted for releasable engagement with said resiliently urged means in the inoperative position thereof, said control means being responsive to fluid pressure in said chamber in excess of a predetermined amount to engage said other means with said resiliently urged means in the inoperative position against movement thereof to the operative position and said control means being responsive to a reduction of fluid pressure in said chamber less than the predetermined amount to permit disengagement of said other means from said resiliently urged means and movement thereof to the operative position in mechanical driving engagement with said actuator means to mechanically energize a friction device, and another fluid pressure chamber defined in said housing between said resiliently urged means and actuator means, said actuator means being movable in response to fluid pressure in said other chamber to effect normal energization of said friction device concurrently with the mechanical energization thereof and said resiliently urged means being urged toward the inoperative position thereof in response to fluid pressure in said other chamber to predeterminately limit the intensity of concurrent normal and mechanical energization of a friction device.

References Cited by the Examiner
UNITED STATES PATENTS

| | | | |
|---|---|---|---|
| 859,843 | 7/1907 | Rogers | 92—24 |
| 2,854,954 | 10/1958 | Howze | 92—130 |
| 2,873,579 | 2/1959 | Safford | 92—63 |
| 3,015,318 | 1/1962 | Mendes | 92—63 |
| 3,062,591 | 11/1962 | Brimhall | 92—94 |
| 3,182,566 | 5/1965 | Berg et al. | 92—24 |

MARTIN P. SCHWADRON, *Primary Examiner.*

RICHARD B. WILKINSON, SAMUEL LEVINE,
*Examiners.*

A. L. SMITH, H. G. SHIELDS, I. C. COHEN,
*Assistant Examiners.*